United States Patent
Furutani et al.

(10) Patent No.: US 7,219,909 B2
(45) Date of Patent: May 22, 2007

(54) FRONT SUSPENSION DEVICE FOR AUTOMOTIVE VEHICLE

(75) Inventors: Shigeki Furutani, Hiroshima (JP); Atsushi Tsuge, Hiroshima (JP); Naoki Ikeda, Hiroshima (JP); Yoshiharu Takahashi, Hiroshima (JP); Susumu Sano, Hiroshima (JP); Yoshitada Toyoshima, Hiroshima (JP); Hiromune Ohhashi, Hiroshima (JP); Toshiaki Aoki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 398 days.

(21) Appl. No.: 10/781,798

(22) Filed: Feb. 20, 2004

(65) Prior Publication Data

US 2004/0178596 A1    Sep. 16, 2004

(30) Foreign Application Priority Data

Mar. 14, 2003 (JP) .............................. 2003-070906

(51) Int. Cl.
*B60G 3/20* (2006.01)

(52) U.S. Cl. .................. 280/124.155; 280/124.145; 280/124.179; 280/86.758; 280/86.75

(58) Field of Classification Search ......... 280/124.147, 280/124.155, 124.145, 124.146, 124.151, 280/124.154, 124.179, 5.522, 5.523, 86.758, 280/86.752, 86.754, 86.75; 267/254, 255, 267/220, 221

See application file for complete search history.

(56) References Cited

U.S. PATENT DOCUMENTS

| | | | |
|---|---|---|---|
| 2,065,071 A | 12/1936 | Harris | |
| 4,817,984 A * | 4/1989 | Ferman et al. | 280/86.752 |
| 4,863,188 A | 9/1989 | Killian | |
| 5,265,902 A * | 11/1993 | Lewis | 280/124.102 |
| 5,348,337 A | 9/1994 | Ando | |
| 5,467,971 A * | 11/1995 | Hurtubise et al. | 267/220 |
| 5,484,161 A * | 1/1996 | McIntyre | 280/124.155 |
| 6,082,720 A * | 7/2000 | Ducloux et al. | 267/221 |
| 6,199,882 B1 * | 3/2001 | Imaizumi et al. | 280/124.146 |
| 6,550,755 B2 * | 4/2003 | Ehrhardt et al. | 267/286 |
| 6,948,728 B2 * | 9/2005 | Pflügner et al. | 280/124.147 |
| 2002/0171223 A1 * | 11/2002 | Chan | 280/124.179 |
| 2003/0006574 A1 * | 1/2003 | Momose et al. | 280/124.155 |
| 2003/0047897 A1 * | 3/2003 | Hurrlein et al. | 280/124.147 |

(Continued)

FOREIGN PATENT DOCUMENTS

EP    01-172-238 A1    1/2002

(Continued)

*Primary Examiner*—Ruth Ilan
(74) *Attorney, Agent, or Firm*—Nixon Peabody LLP; Donald R. Studebaker

(57) ABSTRACT

In a front suspension device for an automotive vehicle, in which wheel support members of right and left front wheels are coupled with each other via a steering unit, outer ends of two lower arms are pivotally attached to the wheel support members, and inner ends of two lower arms are pivotally attached to a vehicle body via a resilient member, there are provided a damping device equipped with a coil spring and attached to one of the two lower arms at its lower end and to the vehicle body at its upper end respectively, and a suppression (rotational torque absorption) device for suppressing a toe-change of the front wheels caused by a rotational torque applied according to extension and contraction of the coil spring of the damping device.

4 Claims, 14 Drawing Sheets

U.S. PATENT DOCUMENTS

2004/0256830 A1* 12/2004 Omi et al. ............ 280/124.147

FOREIGN PATENT DOCUMENTS

| JP | 2-237807 | 9/1990 |
|----|----------|--------|
| JP | 2-279463 | 11/1990 |
| JP | 2-283570 | 11/1990 |
| JP | 3-57709 | 3/1991 |
| JP | 9-300932 | 11/1997 |
| JP | 2002-362123 | 12/2002 |

* cited by examiner (a)

(b)

(a)

(b)

(a)

(b)

Full Rebound Condition (Right Front Wheel)

(a)

(b)

1 G Vehicle Height Condition (Right Front Wheel)

(a)

(b)

1 G Vehicle Height Condition (Left Front Wheel)

FRONT SUSPENSION DEVICE FOR AUTOMOTIVE VEHICLE

BACKGROUND OF THE INVENTION

The present invention relates to a front suspension device for an automotive vehicle, and particularly to a front suspension device for an automotive vehicle, in which wheel support members of right and left front wheels are coupled with each other via a steering unit, an outer end of each of two lower arms is pivotally attached to the wheel support members respectively, and an inner end of each of two lower arms is pivotally attached to a vehicle body via a resilient member.

In general, in a double wishbone type of front suspension device, an upper arm and a lower arm support a wheel via a wheel support member.

The lower arm of the double wishbone type of front suspension device is generally comprised of an A-shaped arm comprised of two arms formed integrally with each other, and the A-shaped arm is connected to the wheel support member via a single ball joint at an (outer) end thereof. This type of front suspension device is superior in the function of tire's contact with ground and the straight driving stability, but it has a disadvantage that it is difficult to set a kingpin axis at an ideal one.

Further, a double pivot type of front suspension device, a different type in the double wishbone type of front suspension device, is known which comprises a lower arm comprised of two independent I-shaped arms which are connected to the wheel support member via ball joints, respectively (for example, U.S. Pat. Nos. 4,863,188 and 5,348,337). This double pivot type of front suspension device can constitute a fictitious kingpin axis passing through an intersection of extended axes of the two I-shaped arms and therefore provide a positive offset of the kingpin properly, thereby improving a vehicle driving stability under a braking condition by controlling wheels so as to change in a displacement in toe-in direction.

In the two types of front suspension device described above, a damping device, which is comprised of a coil spring, a shock absorber and so on, is normally attached to the lower arm (see U.S. Pat. No. 4,863,188).

Meanwhile, the inventors of the present invention have researched eagerly the above-described double pivot type of front suspension device and found out possibilities of preventing the straight driving stability of vehicle from deteriorating and improving the maneuverability and stability by solving a problem caused by the coil spring of the damping device attached which is to the lower arm.

Namely, the coil spring has a characteristic that when it is contracted or extended from its free state, both ends of the coil are apt to rotate about a coil axis in an opposite direction to each other. The inventors, paying their attentions to this characteristic, have figured out the following. Namely, the coil spring of the damping device under a normal driving condition is kept in a contracted state by receiving a vehicle weight. At this time, there occurs a rotational torque at the coil spring because of a winding of the coil spring, and the rotational torque is conveyed to the lower arm. Accordingly, a bush (resilient member), which is provided at an attaching portion of the lower arm to a vehicle body, is deformed by the conveyed rotational torque. As a result, the lower arm changes in a displacement and then a toe angle of the wheel also changes, resulting in deterioration of the straight driving stability of vehicle. Also, a caster trail of the wheel changes, resulting in deterioration of the straight driving stability of vehicle as well.

Herein, the above-described characteristics of the coil spring will be explained more referring to FIG. 12. FIG. 12 is a conceptual diagram for explaining a force acting on the coil spring and a force occurring at the same.

As shown in FIG. 12, when a compressing force P is added to a coil spring 100 with a counterclockwise-winding direction, when viewed from above, in a coil axis direction, there occurs a rotational torque E which is apt to rotate an upper end and an lower end of the coil spring 100 in an opposite direction to each other in such manner that the upper end rotates counterclockwise about the coil axis and the lower end rotates clockwise about the coil axis. As a result, if both of the upper and lower ends of the coil spring are fixed, the rotational torque occurs which are apt to rotate the upper end counterclockwise and the lower end clockwise.

The inventors of the present invention also have found out how the lower arm may change in a displacement according to this characteristic of the coil spring and how the displacement change of the lower arm may influence changes of toe angle and caster trail of the wheel (front wheel), which will be explained referring to FIGS. 13 to 15.

FIG. 13 is a diagram for showing schematically a positional relationship between the lower arm and the front wheel under "a full rebound condition" where a right front wheel of a front suspension device does not contact on the ground and a vehicle weight does not act on a damping device; an elevation view FIG. 13(a) and a plan view FIG. 13(b). Meanwhile, FIG. 14 is a diagram for schematically showing a positional relationship between the lower arm and the front wheel under a vehicle stop condition or a straight driving condition with a constant speed (hereinafter, referred to as "1 G vehicle height condition") where the right front wheel of the front suspension device contacts on the ground and the vehicle weight acts on the damping device; an elevation view FIG. 14(a) and a plan view FIG. 14(b). Further, FIG. 15 is a plan view for schematically showing a positional relationship between the lower arm and the left front wheel under the 1 G vehicle height condition.

In the front suspension device shown in FIGS. 13 to 15, a winding direction of the coil spring 104 of the damping device 102 is a counterclockwise one for both of the right and left front wheels.

Although the coil spring 104 is extended to a certain degree receiving (supporting) weights of the wheel and the like under the full rebound condition shown in FIG. 13, the lower arms 106, 108 and the right front wheel 110a are located at their substantially regular positions.

Meanwhile, as shown in FIG. 14, the coil spring 104 is contracted under the 1 G vehicle height condition (vehicle stop condition or straight driving condition with constant speed). At this moment, since the coil spring 104 has the counterclockwise-winding direction, there occurs a rotational torque F with clockwise direction at the lower end of the coil spring 104. The lower arm 106 receives this rotational torque, and then bushes 112, 114 provided at attaching portions of the lower arms 106, 108 to the vehicle body are deformed. As a result, the lower arms 106, 108 and the right front wheel 110a change in displacement such that a forward end of the right front wheel moves toward inside and eventually the wheel changes in a toe angle, as shown in FIG. 14.

In general, the coil springs of the damping devices of both of the right and left wheels have the same winding direction (in this case, the counterclockwise direction) for the purpose of a commonality of parts. Accordingly, the direction of the rotational torque conveyed to each lower arm is asymmetric with respect to the right and left (in this case, the same clockwise direction), and the left front wheel changes in a displacement such that a forward end of the left front wheel 110b moves toward outside, as shown in FIG. 15. As a result, both of the right and left front wheels change in their toe angles so as to point in the same direction, resulting in deterioration of the straight driving stability of vehicle.

Further, the displacement of the lower arm also changes a caster trail of the wheel. If the displacement of the lower arm is asymmetric with respect to the right and left wheels as shown in FIGS. 14, 15, there occurs a difference of caster trail between the right and left wheels. The difference of the caster trail may bring about a difference of self aligning torque between the right and left wheels, thereby deteriorating the straight driving stability of vehicle. Particularly, when being influenced by an irregular load surface such as a rut and a cant under a straight driving condition, the difference of self aligning torque may influence inappropriately the straight driving stability of vehicle.

Herein, although there occurs a similar displacement of the lower arm in the above-described front suspension device with A-shaped arm because of deformation of bush, the arm of this type is comprised of two arms formed integrally with each other. Accordingly, it was also figured out by the inventors that there hardly occurs any displacement of the lower arm to cause such toe-angle change of the wheel and influence inappropriately the straight driving stability in this type of the front suspension device.

SUMMARY OF THE INVENTION

The present invention has been devised in view of the above-described novel problems, and an object of the present invention is to provide a front suspension device for an automotive vehicle that can prevent deterioration of the straight driving stability of vehicle brought about by changes of a toe angle and a caster trail of a wheel which are caused by a rotational torque occurring according to extension and contraction of a coil spring of a damping device, and can improve maneuverability and stability.

In order to achieve the above-described object, the present invention provides a front suspension device for an automotive vehicle, in which wheel support members of right and left front wheels are coupled with each other via a steering unit, an outer end of each of two lower arms is pivotally attached to the wheel support members respectively, and an inner end of each of two lower arms is pivotally attached to a vehicle body via a resilient member respectively, the front suspension device comprising a damping device equipped with a coil spring and attached to at least one of the two lower arms at a lower end thereof and to the vehicle body at an upper end thereof, respectively, and a suppression device for suppressing a toe-change of the front wheels caused by a rotational torque which is applied to the at least one of the two lower arms, to which the damping device is attached, according to extension and contraction of the coil spring of the damping device.

According to the present invention, the damping device is equipped with the coil spring and attached to at least one of the two lower arms at its lower end and to the vehicle body at its upper end, and an inappropriate displacement change of the front wheel caused by a rotational torque normally occurring according to extension and contraction of the coil spring of the damping device is suppressed by the suppression device. As a result, deterioration of the straight driving stability of vehicle caused by changes of the toe angle and the caster trail of the wheel can be avoided properly.

Preferably, the suppression device of the present invention comprises a rotational torque absorption device for absorbing the rotational torque applied according to extension and contraction of the coil spring of the damping device.

According to the front suspension device configured above, the rotational torque of the coil spring is not conveyed to the lower arm, and the inappropriate displacement change of the front wheel can be prevented certainly.

Further preferably, the rotational torque absorption device of the present invention comprises a bearing device provided at an upper end and/or a lower end of the coil spring.

According to the front suspension device configured above, the bearing device can absorb any rotational torque certainly regardless of its magnitude and its direction.

Preferably, the suppression device of the present invention includes a vehicle body member which constitutes part of the vehicle body to which the damping device is attached at the upper end thereof and is equipped with an elongated hole formed so as to extend in a circumferential direction of the damping device, and an attaching member for attaching the damping device to the vehicle body with an attaching bolt which is adaptive to get through the elongated hole of the vehicle body member, and the damping device is attached to the vehicle body by the attaching member such that the attaching bolt is fastened in a state where there is provided no or a small amount of rotational torque applied to the at least one of the two lower arms, by applying a load corresponding to a vehicle weight to the coil spring so as to allow the attaching bolt unfastened to move in and along the elongated hole.

According to the front suspension device configured above, the damping device is equipped with the coil spring and attached to at least one of the two lower arms at its lower end and to the vehicle body at its upper end, and the rotational torque occurs according to extension and contraction of the coil spring of the damping device. However, herein the damping device is attached to the vehicle body by the attaching member such that the attaching bolt is fastened in a state where there is provided no or a small amount of rotational torque applied to the at least one of the two lower arms, by applying the load corresponding to the vehicle weight to the coil spring so as to allow the attaching bolt unfastened to move in and along the elongated hole.

As a result, according to the front suspension device configured above, no or only a small amount of rotational torque is applied to the lower arm under a straight vehicle driving condition, and deterioration of the straight driving stability of vehicle caused by changes of the toe angle and the caster trail of the wheel can be avoided properly.

Preferably, the suppression device of the present invention is configured such that the damping device is attached to the vehicle body in a state where a specified twisted-pretension is applied to the coil spring prior to the attachment of the damping device, and there occurs no or a small amount of rotational torque applied to the at least one of the two lower arms according to extension and contraction of the coil spring under at least a straight vehicle driving condition.

According to the front suspension device configured above, the damping device is equipped with the coil spring and attached to at least one of the two lower arms at its lower end and to the vehicle body at its upper end, and the rotational torque occurs according to extension and contraction of the coil spring of the damping device. However, herein the damping device is attached to the vehicle body in the state where the specified twisted-pretension is applied to the coil spring prior to the attachment of the damping device, and there occurs no or a small amount of rotational torque applied to the at least one of the two lower arms according to extension and contraction of the coil spring under at least the straight vehicle driving condition. As a result, according to the front suspension device configured above, no or only a small amount of rotational torque is applied to the lower arm under the straight vehicle driving condition, and deterioration of the straight driving stability of vehicle caused by changes of the toe angle and the caster trail of the wheel can be avoided properly.

Preferably, the suppression device of the present invention is configured such that the lower arms are arranged so as to be attached to the vehicle body in a specified state where the arrangement functions so as to suppress or offset a displacement of the lower arm caused by the rotational torque which is applied to the at least one of the two lower arms according to extension and contraction of the coil spring.

According to the front suspension device configured above, the damping device is equipped with the coil spring and attached to at least one of the two lower arms at its lower end and to the vehicle body at its upper end, and the rotational torque occurs according to extension and contraction of the coil spring of the damping device. However, herein the lower arms are arranged so as to be attached to the vehicle body in the specified state where the arrangement functions so as to suppress or offset a displacement of the lower arm caused by the rotational torque. As a result, according to the front suspension device configured above, no or only a small amount of rotational torque is applied to the lower arm under the straight vehicle driving condition, and deterioration of the straight driving stability of vehicle caused by changes of the toe angle and the caster trail of the wheel can be avoided properly.

Preferably, the suppression device of the present invention is configured such that each of the coil springs for the right and left front wheels has a different winding direction from each other.

According to the front suspension device configured above, the damping device is equipped with the coil spring and attached to at least one of the two lower arms at its lower end and to the vehicle body at its upper end, and the rotational torque occurs according to extension and contraction of the coil spring of the damping device. However, herein, since the winding direction of the springs for the right and left front wheels is configured so as to be different from each other, the rotational torques at those springs occur in the opposite direction to each other. As a result, according to the front suspension device configured above, the right and left front wheels change in their toe angles symmetrically and the both wheels have the same amount of caster trail, and deterioration of the straight driving stability of vehicle can be avoided properly.

Further preferably, the winding direction of the coil spring is configured such that the coil spring for the left front wheel has a clockwise direction, while the coil spring for the right front wheel has a counterclockwise direction.

According to the front suspension device configured above, both of the front wheels change in toe-in direction, and deterioration of the straight driving stability of vehicle can be avoided properly.

Further preferably, the winding direction of the coil spring is configured such that the rotational torque caused according to extension and contraction of the coil spring makes a steered outside wheel under a steering condition change in a displacement in a toe-in direction.

According to the front suspension device configured above, the steered outside wheel always change in the toe-in direction under the steering condition, thereby improving a vehicle stability under the steering condition.

Still further preferably, the damping device is disposed in a substantially vertical direction of the vehicle.

Accordingly, a moving direction of the wheels coincides with that of the damping device, thereby providing a smooth movement of the damping device. Further, in the event that the damping device is disposed in the vertical direction of the vehicle, just small force to suppress the displacement of the lower arm caused by the rotational torque of the coil spring is generated compared with the event that the damping device is disposed at a slant forward or rearward with respect to the lower arm. However, the present invention is configured such that there occurs no displacement of the lower arm caused by the rotational torque of the coil spring, and the damping device can perform its function effectively and the straight driving stability of vehicle can be improved properly.

Preferably, the two lower arms include a front lower arm comprised of a lateral link extending outward from the vehicle body in a substantially width direction of the vehicle and a rear lower arm comprised of a compression link extending forward and outward from the vehicle body in a substantially oblique direction of the vehicle, and a position of a pivotal attachment of the front lower arm to the wheel support member is located forward and inside of that of a pivotal attachment of the rear lower arm to the wheel support member.

According to the front suspension device configured above, sensitivity of a steered-angle change with respect to a handle operation can be improved, and the straight driving stability of vehicle can be improved properly because it is configured such that there occurs no displacement of the lower arm caused by the rotational torque of the coil spring. Herein, the lower arms and two pivotal connections thereof are arranged so as to provide an increased sensitivity of the handling, and accordingly, the displacement of the lower arm caused by the rotational torque of the coil spring may cause too much toe change. However, the present invention is configured such that there occurs no displacement of the lower arm caused by the rotational torque of the coil spring, and thus, the sensitivity of the handling can be increased and the straight driving stability of vehicle can be improved properly.

Further, the present invention provides a method for manufacturing a front suspension device for an automotive vehicle, in which wheel support members of right and left front wheels are coupled with each other via a steering unit, an outer end of each of two lower arms is pivotally attached to the wheel support members respectively, an inner end of each of two lower arms is pivotally attached to a vehicle body via a resilient member respectively, the method comprising step of providing a damping device equipped with a coil spring, step of attaching a lower end of the damping device to at least one of the two lower arms, and step of attaching an upper end of the damping device to a vehicle body in a state where the coil spring has been contracted to a specified extent and a rotational torque caused by the contracted coil spring has been released, such that there occurs no or a small amount of the rotational torque applied to the at least one of the two lower arms according to extension and contraction of the coil spring under at least a straight vehicle driving condition.

Still further, the present invention provides a method for manufacturing a front suspension device for an automotive vehicle, in which wheel support members of right and left front wheels are coupled with each other via a steering unit, an outer end of each of two lower arms is pivotally attached to the wheel support members respectively, an inner end of each of two lower arms is pivotally attached to a vehicle body via a resilient member respectively, the method comprising step of providing a damping device equipped with a coil spring, step of attaching a lower end of the damping device to at least one of the two lower arms, and step of attaching an upper end of the damping device to a vehicle body in a state where the coil spring has been twisted to a specified extent in a specified direction about a spring axis, such that there occurs no or a small amount of the rotational torque applied to the at least one of the two lower arms according to extension and contraction of the coil spring under at least a straight vehicle driving condition.

BRIEF DESCRIPTION OF THE DRAWINGS

Other features, aspects and advantages of the present invention will be apparent from the following description of the present invention which refers to the accompanying drawings.

DETAILED DESCRIPTION OF THE INVENTION

Hereinafter, preferred embodiments of the present invention will be described with reference to the accompanying drawings.

Embodiment 1

Figure 1:
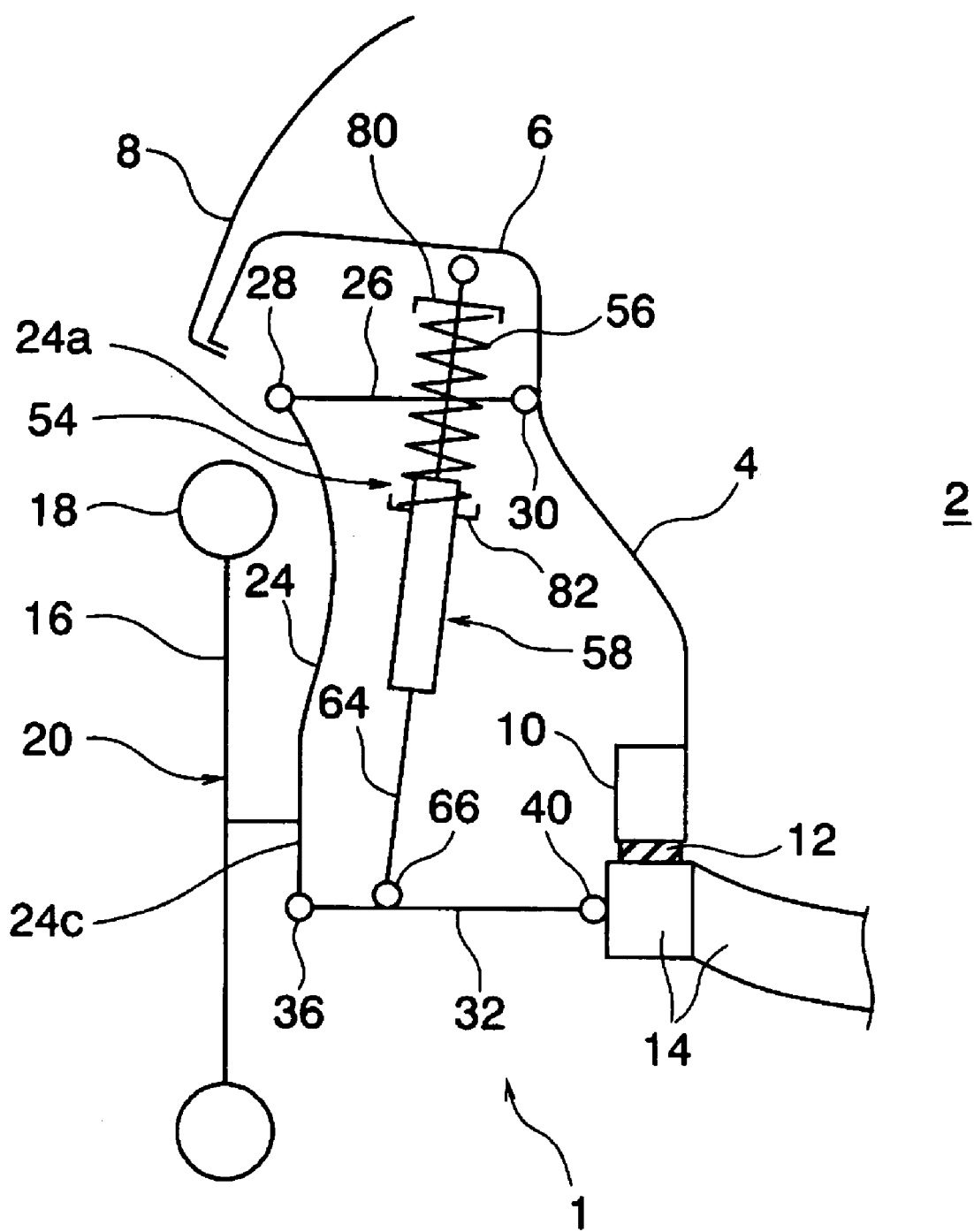
FIG. 1 is an elevation view for showing schematically a front suspension device for an automotive vehicle according to the first embodiment of the present invention, when viewed from the front of a vehicle.
Figure 2:
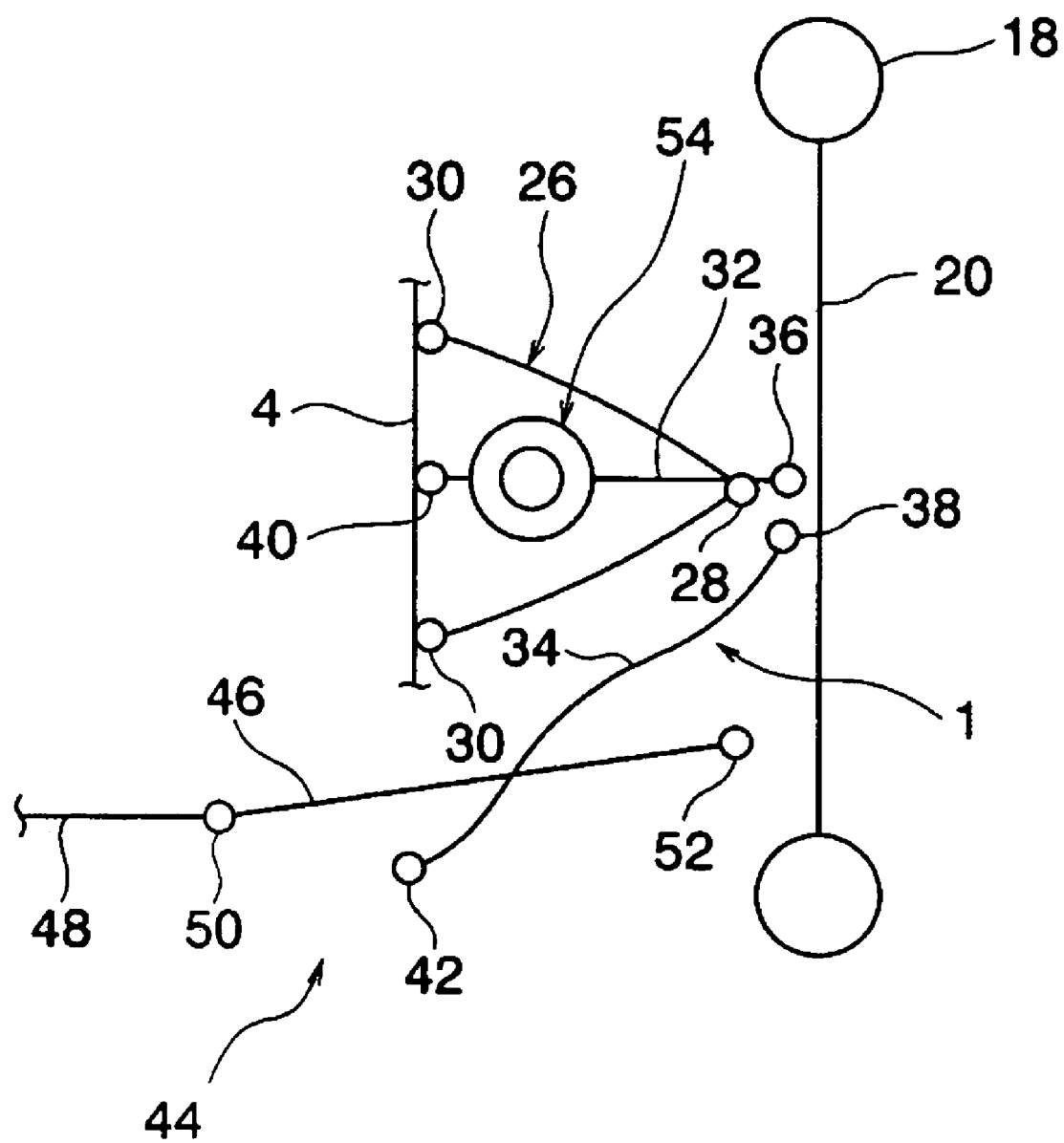
FIG. 2 is a plan view of FIG. 1.
Figure 3:
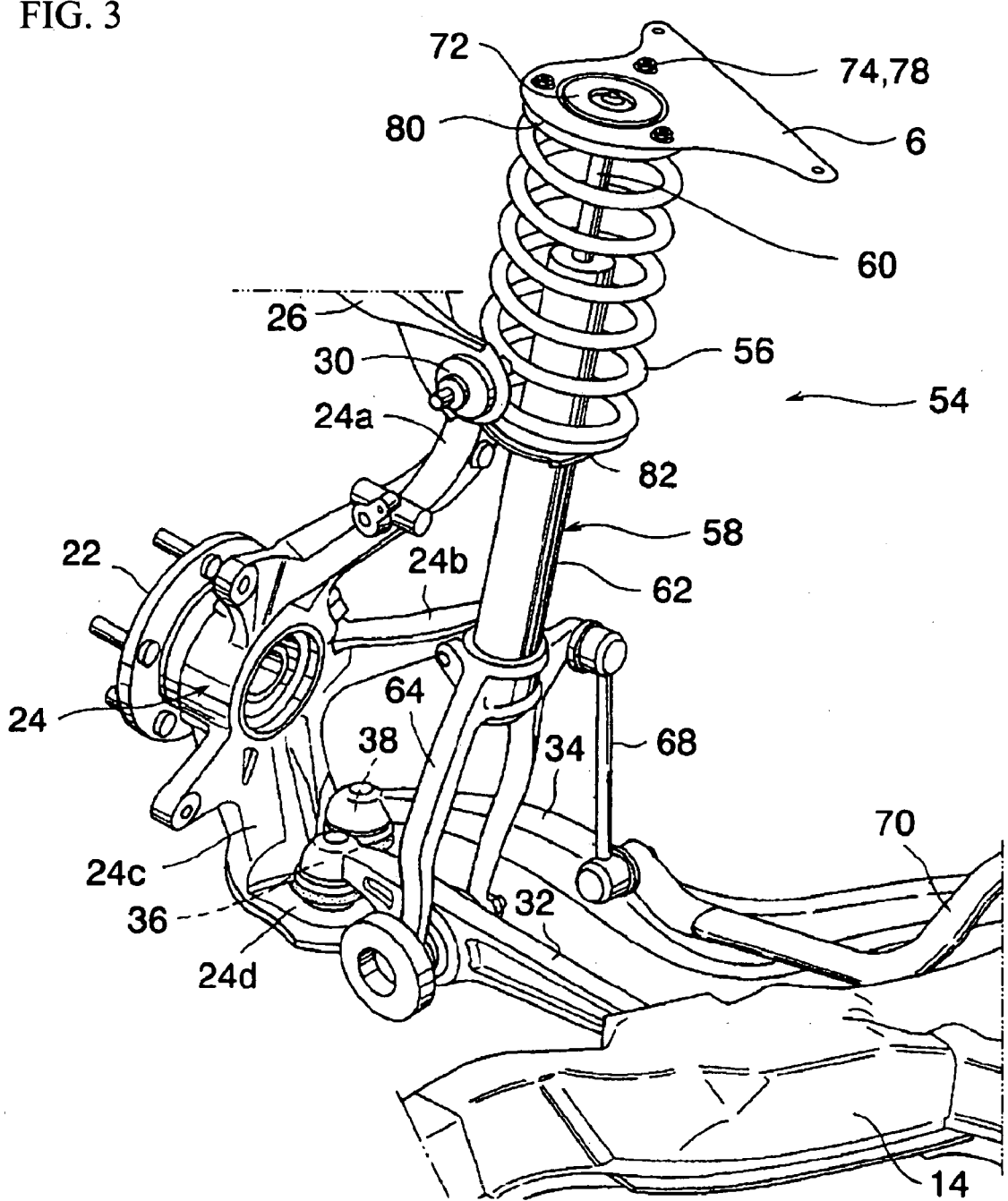
FIG. 3 is a perspective view for showing schematically the front suspension device for an automotive vehicle according to the first embodiment of the present invention, when viewed from the front of a vehicle.

FIG. 1 is an elevation view for showing schematically a front suspension device for an automotive vehicle according to the first embodiment of the present invention, when viewed from the front of a vehicle. FIG. 2 is a plan view of FIG. 1. FIG. 3 is a perspective view for showing schematically the front suspension device for an automotive vehicle according to the first embodiment of the present invention, when viewed from the front a vehicle. Herein, the front suspension device for an automotive vehicle has the same basic structure for the right-front wheel side and the left-front wheel side, and FIGS. 1 to 3 show only a structure of the front suspension device at the right-front wheel side.

In a double wishbone type of front suspension device 1 according to the first embodiment of the present invention, as shown in FIGS. 1 and 2, there is provided a wheel inner panel 4 constituting an outer wall of an engine room 2, and a suspension tower portion 6 is formed integrally with an upper portion of the wheel inner panel 4, and a front fender panel 8 is attached to an outer portion of the suspension tower portion 6.

A front side frame 10, extending in a longitudinal direction of the vehicle and with a closed section, is provided at a lower portion of the wheel inner panel 4 which supports a suspension cross member 14 via a rubber mount 12.

A reference numeral 24 denotes a wheel support member, on which a front wheel 20 equipped with a wheel disc 16 and a tire 18 is supported via a wheel hub 22 (see FIG. 3) and a bearing.

The wheel support member 24, which supports the front wheel 20 so as to let it be rotatable, includes an extension portion 24a extending upward for connecting an upper arm, an extension portion 24c extending downward for connecting a lower arm, and an extension portion 24d extending rearward for connecting a steering unit, as shown in FIG. 3. Further, there is provided a lower-arm supporting portion 24d extending substantially in a horizontal direction and in a width direction of the vehicle at a lower end of an extension portion 24c for connecting the lower arm.

As shown in FIG. 1, an A-shaped upper arm 26 comprised of two arms which are formed integrally with each other is disposed above the wheel support member 24, which is connected to an upper end of the extension portion 24a of the wheel support member 24 via a ball joint 28 at an outside end portion thereof. Each inside end portion of the arms of the upper arm 26 is, as shown in FIGS. 1 and 2, connected pivotally to the wheel inner panel 4 of the vehicle body via a cylindrical upper arm bush (resilient member) 30 and a bracket (not shown) so that the upper arm 26 can move freely in the vertical direction of the vehicle.

As shown in FIGS. 1 to 3, two lower arms 32, 34 are disposed below the wheel support member 24, which are comprised of one independent I-shaped arm, respectively. The front lower arm 32 which is located forward is formed of a lateral link extending outward from the vehicle body, which is connected to the lower arm supporting portion 24d of the wheel support member 24 via a ball joint 36 at an outside end portion thereof. The rear lower arm 34 which is located rearward is formed of a compression link extending forward and outward, i.e. obliquely from the vehicle body, which is connected to the lower arm supporting portion 24d of the wheel support member 24 via a ball joint 38 at an outside end portion thereof. Inside end portions of the lower arms 32, 34 are connected pivotally to the suspension cross member 14 via a cylindrical front lower arm bush (resilient member) 40 and a cylindrical rear lower arm bush (resilient member) 42 so that the lower arms 32, 34 can move freely in the vertical direction of the vehicle.

Figure 4:
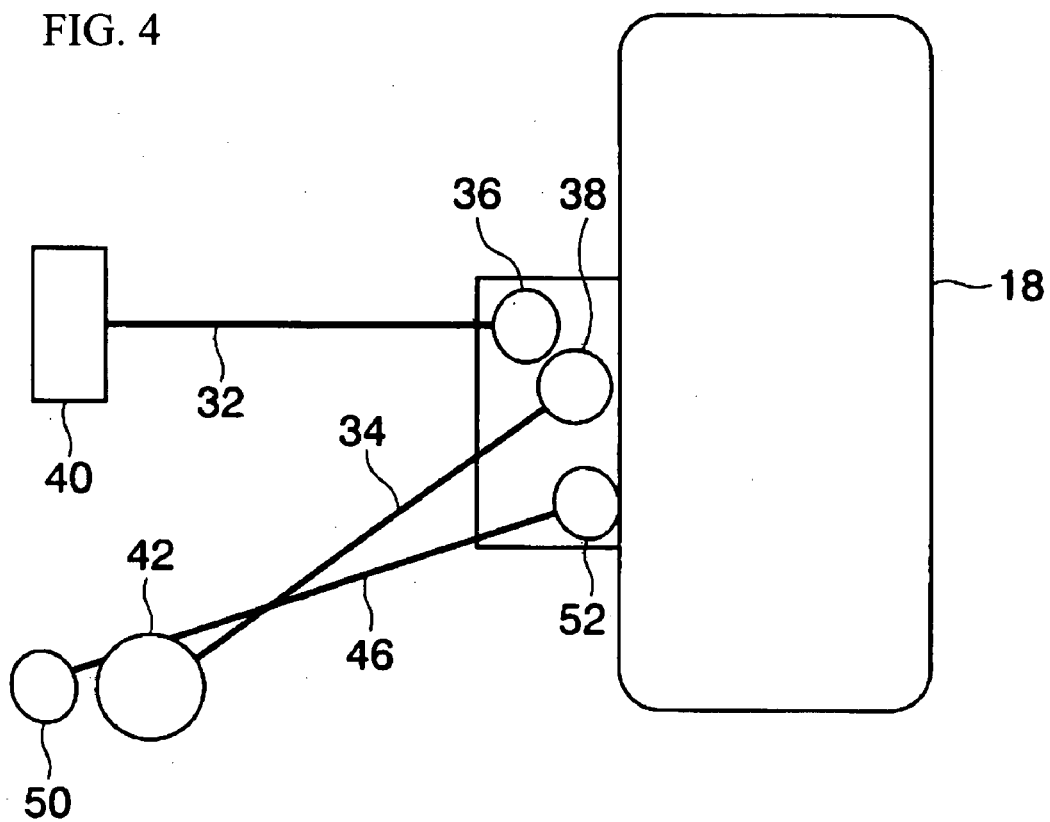
FIG. 4 is a plan view for schematically showing a positional relationship between a lower arm and a front wheel of the front suspension device for an automotive vehicle according to the first embodiment of the present invention.

Herein, the connecting position of the lower arms 32, 34 for the right front wheel are arranged, as shown in FIG. 4, such that the ball joint 36 of the front lower arm 32 is located forward and inward of the vehicle with respect to the ball joint 38 of the rear lower arm 34.

Figure 5:
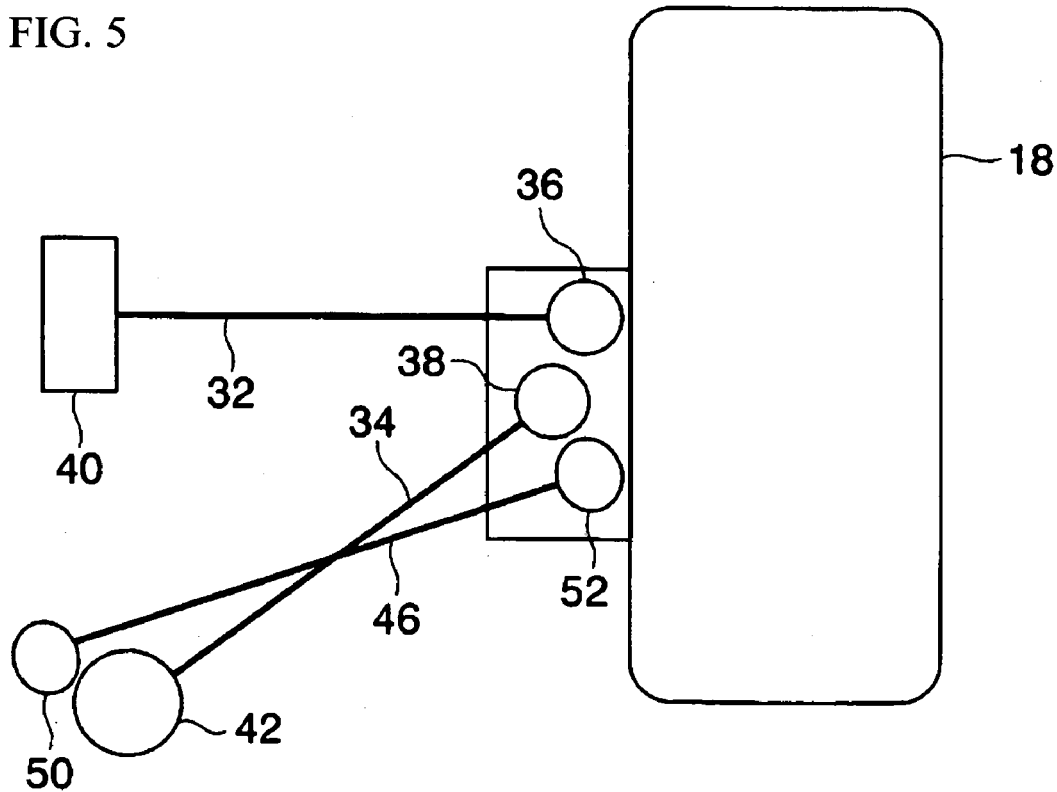
FIG. 5 is a plan view for schematically showing a positional relationship between a lower arm and a front wheel of the front suspension device for an automotive vehicle according to another example of the first embodiment of the present invention.

Further, as shown in FIG. 5, the lower arms 32, 34 may be attached to the wheel support member 24 such that the ball joint 36 of the front lower arm 32 is located forward and outward of the vehicle with respect to the ball joint 38 of the rear lower arm 34.

Further, the pivot arrangement of FIG. 4, namely, the ball joint 36 of the front lower arm 32 is located forward and inward of the vehicle with respect to the ball joint 38 of the rear lower arm 34, can increase sensitivity of a steered-angle change with respect to a handle operation, compared with the pivot arrangement of FIG. 5, thereby improving a handling response and a handling feeling.

As shown in FIGS. 2, 4 and 5, a steering unit 44 is provided below the wheel support member 24. The steering unit 44, which steers the front wheels 20 about a kingpin axis, includes tie rods 46, 46 for the left and right wheels, a relay rod 48 connecting the tie rods 46, 46 with each other, and a steering mechanism (not shown). The tie rod 46 and the relay rod 48 are connected via a ball joint 50, and an outside end portion of the tie rod 46 is connected to a rear end portion of the extension portion 24b of the wheel support member 24 via a ball joint 52. In this way, the wheel support members 24, 24 for the left and right front wheels 20, 20 are connected via the steering unit 44.

As shown in FIGS. 1 and 3, a damping device 54 is provided above the front lower arm 32. The damping device 54 includes a coil spring 56 and a damper 58. The damper 58 includes a piston rod 60 and a cylinder 62. Herein, the damping device 54 for the left and right front wheels has the same-winding-direction coil spring 56 with a counterclockwise direction.

The damping device 54 is provided with a damper fork 64 at a lower end portion thereof, and the damper fork 64 and the front lower arm 32 are connected pivotally via a cylindrical bush (resilient member) 66.

The damping device 54 is disposed in the substantially vertical direction of the vehicle as shown in FIGS. 1 and 3. Accordingly, a moving direction of the wheel 20 coincides with that of the damping device 54, thereby providing a smooth movement of the damping device 54.

Herein, a control link 68 is coupled to the damping device 54, which is coupled to a stabilized 70. The stabilizer 70 can control a rolling angle of the vehicle properly by its torsional rigidity under an one-wheel bump or rebound condition.

Figure 6:
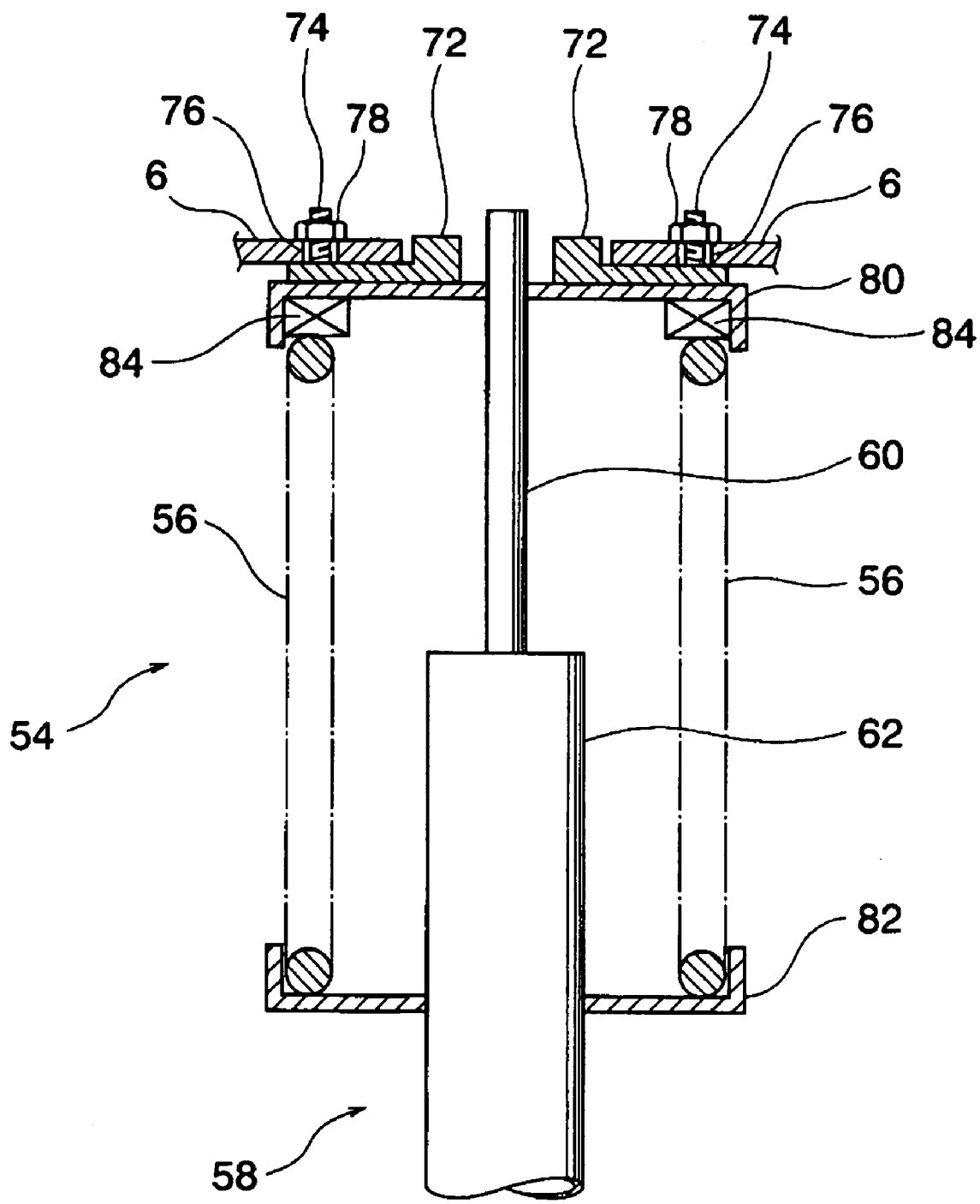
FIG. 6 is an enlarged sectional view for showing part of a damping device of the front suspension device for an automotive vehicle according to the first embodiment of the present invention.

FIG. 6 is an enlarged sectional view for showing part of the damping device. As shown in FIGS. 3 and 6, the damping device 54 includes an attaching member 72 at the upper end portion, and it is attached to the suspension tower portion 6 (see FIG. 1) via the attaching member 72. Specifically, bolts 74 extending upward from the attaching member 72, which get through holes 76 formed at the suspension tower portion 6, are fastened by nuts 78.

The attaching member 72 includes an upper sheet 80 to hold the coil spring 56 which is fixed thereto. The above-described piston rod 60 of the damper 58 is fixed to the upper sheet 80, and a lower sheet 82 to hold the coil spring 56 is fixed to the cylinder 62 of the damper 58. Herein, the attaching member 72 and the upper sheet 80 are formed of an integral member.

There is provided a bearing device 84, which is a rotational torque absorption device, between an upper end of the coil spring 56 and the upper sheet 80. The bearing device 84 is not shown in FIGS. 1 and 2. A lower end of the coil spring 56 is placed on the lower sheet 82 in a substantially fixed state by a friction between them. The coil spring 56 is held by the bearing device 84 and the lower sheet 82.

The bearing device 84 allows the upper end of the coil spring 56 to rotate freely about the coil axis, even if there occurs the rotational torque about the coil axis according to extension and contraction of the coil spring 56. Namely, the rotational torque of the coil spring 56 is configured so as to be absorbed all the time.

Herein, the bearing device 84 may be disposed between the lower end of the coil spring 56 and the lower sheet 82, or it may also be disposed at other portions as long as it can absorb the rotational torque of the coil spring 56. For example, it may be disposed between the upper sheet 80 and the attaching member 72, or between the damper fork 64 and the cylinder 62.

Next, the function of the above-described first embodiment will be described.

Figure 14:
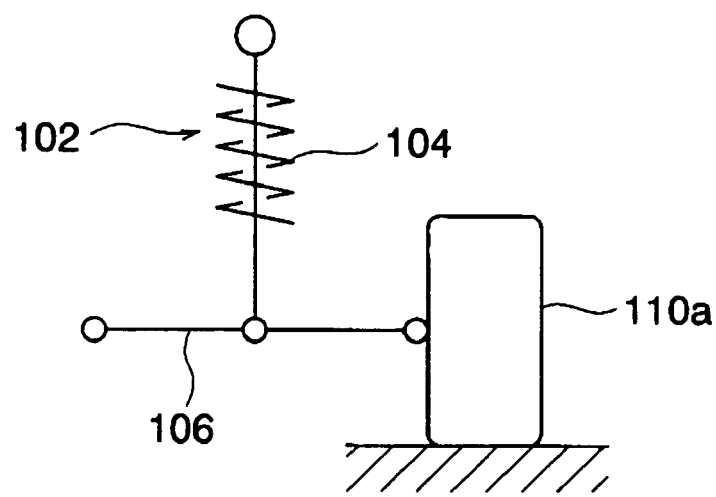
FIG. 14(a), (b) are diagrams for schematically showing positional relationships between the lower arm and the front wheel under a vehicle stop condition or a straight driving condition with a constant speed (1 G vehicle height condition) where the right front wheel of the front suspension device contacts on the ground; an elevation view FIG. 14(a) and a plan view FIG. 14(b).
Figure 14:
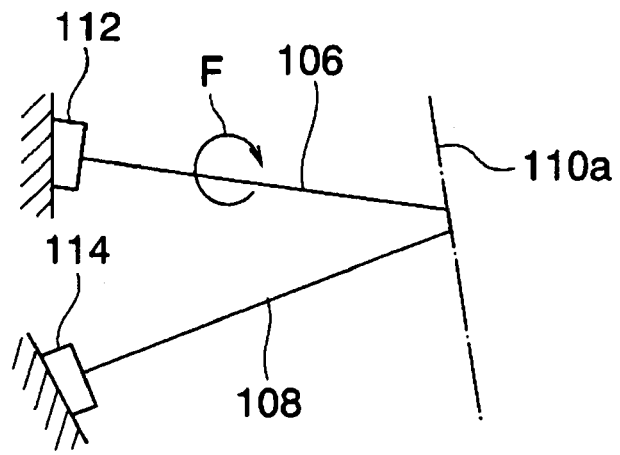
Figure 15:
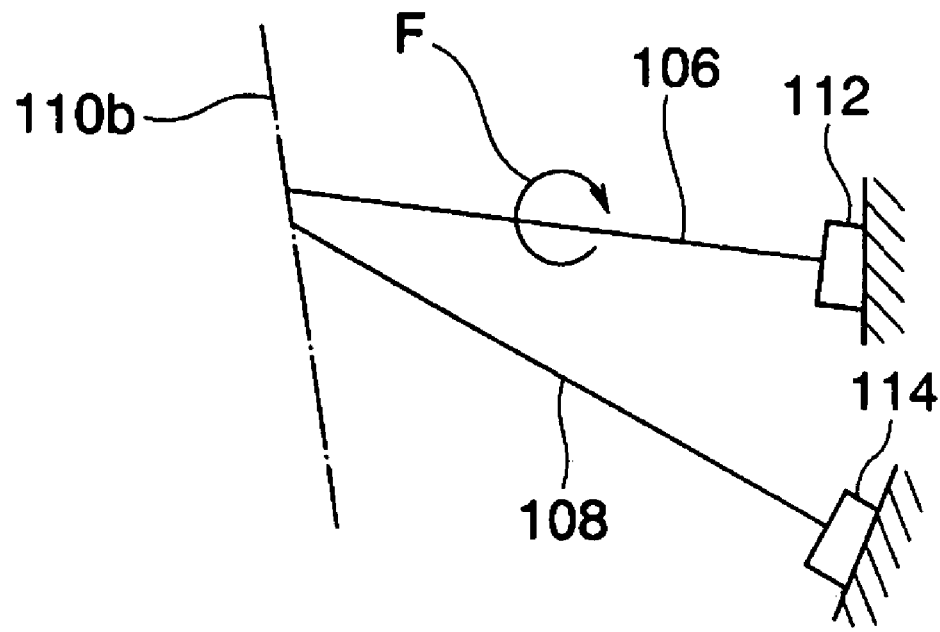
FIG. 15 is a plan view for schematically showing a positional relationship between the lower arm and the front wheel under the 1 G vehicle height condition.

Firstly, unless the bearing device 84 according to the present embodiment is provided, as shown in FIG. 14, the coil spring 104 is contracted by the vehicle weight under the straight driving condition. Accordingly, there occurs the rotational torque F with clockwise direction at the lower end of the coil spring 104. The front lower arm 106 receives the rotational torque F, and bushes 112, 114 provided at attaching portions of the lower arms 106, 108 to the vehicle body are deformed. As a result, the lower arms 106, 108 and the right front wheel 110a change in displacement such that the forward end of the right front wheel 110a moves toward inside and the wheel changes in a toe angle. Particularly, the front lower arm 106 changes in a displacement so as to rotate clockwise as shown in FIG. 14(b), so that the forward end of the right front wheel 110a moves toward inside and changes its toe angle. The left front wheel 110b also changes in a displacement such that the forward end of the left front wheel 110b moves toward outside and changes its toe angle, as shown in FIG. 15. Further, the displacement of the lower arm 106 also changes the caster trail of the wheel, and accordingly there occurs the difference in a caster trail between the left and right wheels.

In the present embodiment, however, there is provided the bearing device 84 to absorb the rotational torque of the coil spring 56. Namely, there is provided a free rotation of the coil spring 56 about the coil axis in the present embodiment. Accordingly, even if the coil spring 56 is contracted by the vehicle weight and there occurs the rotational torque at the coil spring 56, the upper end of the spring rotates freely accordingly, and the rotational torque of the coil spring 56 is not conveyed to the front lower arm 32.

As a result, the deterioration of the straight driving stability of vehicle which may be caused by changes of the toe angle and the caster trail of the wheel brought about by the rotational torque of the coil spring 56 can be avoided properly under the straight driving condition. Further, even if a weight change happens to the vehicle body by an acceleration or deceleration of the vehicle under the straight driving condition and then the rotational torque occurs according to extension or contraction of the coil spring 56 from the steady straight driving condition, the bearing device 84 can absorbs any rotational torque properly and the deterioration of the straight driving stability of vehicle caused by changes of the toe angle and the caster trail of the wheel can be avoided properly.

Meanwhile, when the vehicle is steered and then the vehicle rolls, the coil spring 56 of the steered outside wheel is contracted and the coil spring 56 of the steered inside wheel is extended because of the vehicle weight change.

In the present embodiment, however, the bearing device 84 absorbs the rotational torque of the coil spring 56 properly even under the vehicle rolling condition, and the rotational torque of the coil spring 56 is not conveyed to the front lower arm 32 any more. As a result, the deterioration of the maneuverability and stability of vehicle, which may be caused by changes of the toe angle and the caster trail of the wheel brought about by the rotational torque of the coil spring 56, can be also avoided properly under the rolling condition.

As described above, since it is absorbed by the bearing device 84 in the present embodiment, the rotational torque of the coil spring 56 is not conveyed to the front lower arm 32 under the straight driving condition, the acceleration or deceleration condition, and the rolling condition. Accordingly, the changes of toe angle and caster trail of the wheel can be suppressed.

Embodiment 2

Figure 7:
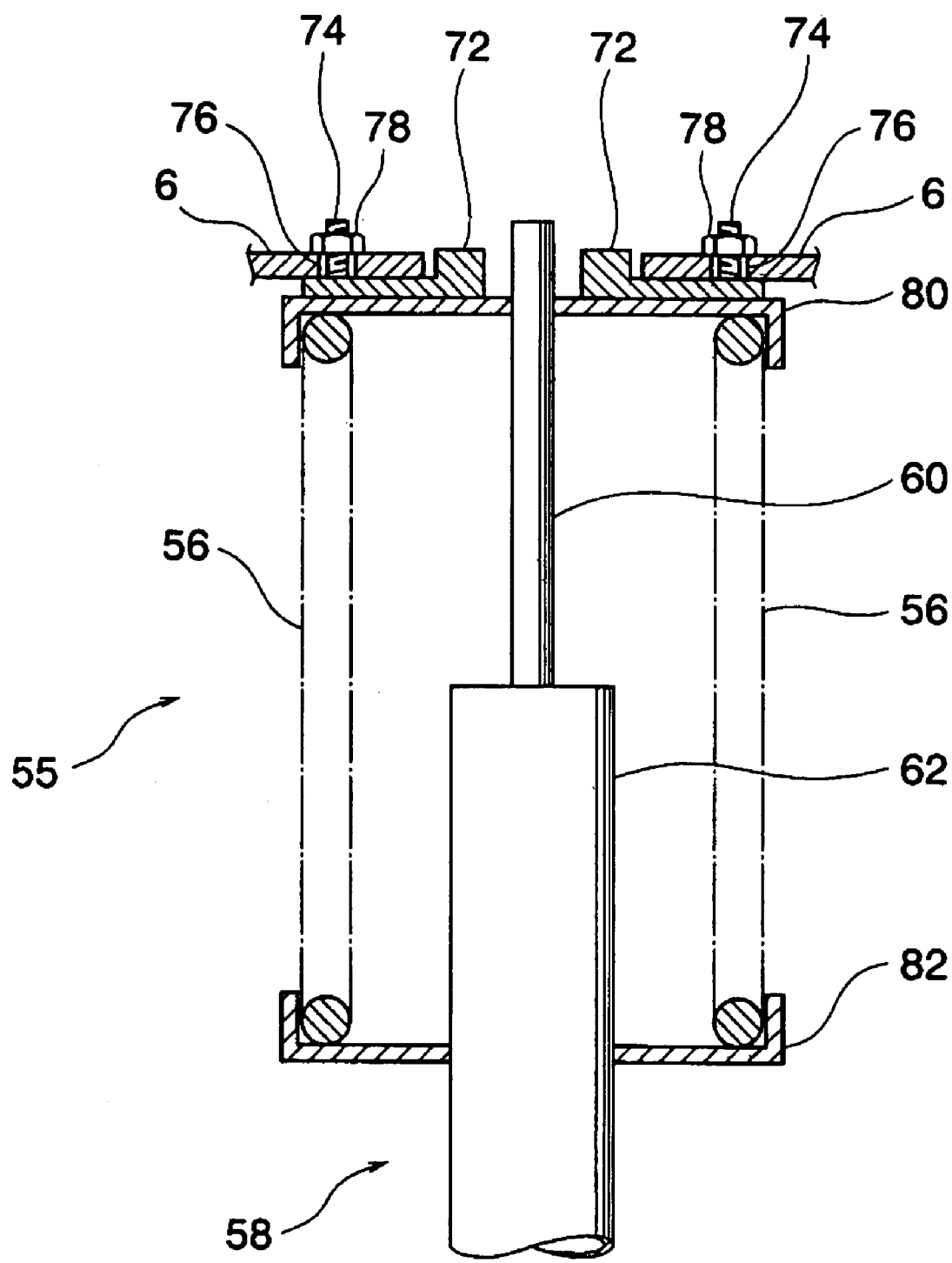
FIG. 7 is an enlarged sectional view for showing part of a damping device of a front suspension device for an automotive vehicle according to the second embodiment of the present invention.
Figure 8:
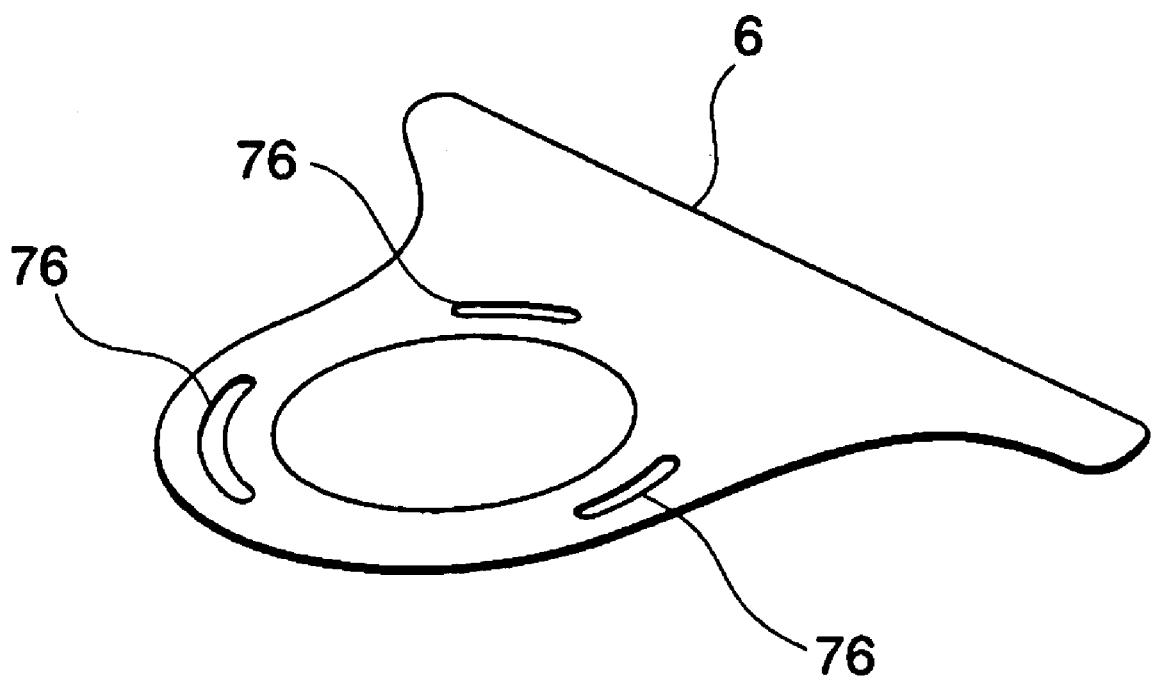
FIG. 8 is a perspective view for showing part of a suspension tower portion according to the second embodiment of the present invention.

Next, a front suspension device for an automotive vehicle according to the second embodiment of the present invention will be described. The basic structure of the suspension device of the second embodiment is the same as that of the first embodiment shown in FIGS. 1 to 5, and a different structure will be described referring to FIGS. 7 and 8. FIG. 7 is an enlarged sectional view for showing part of a damping device of the front suspension device for an automotive vehicle according to the second embodiment of the present invention. FIG. 8 is a perspective view for showing a suspension tower portion.

In the front suspension device of the second embodiment, a damping device 55 is attached to the vehicle body such that an attaching bolt 74 is fastened in a state where there is provided no or a small amount of rotational torque of the coil spring 56, by applying a load corresponding to the vehicle weight to the coil spring 56 so as to allow the attaching bolt 74 unfastened to move in and along an elongated hole 76 formed at the suspension tower portion 6.

The damping device 55 of the present embodiment is not provided with a bearing device (see FIG. 6) as shown in FIG. 7, and other structure is the same as that shown in FIG. 6.

In the present embodiment, an elongated hole 76 extending in a circumferential direction, shown in FIG. 8, is formed at the suspension tower portion 6, and the bolt 74 of the attaching member 72 is movable along the elongated hole 76 in the circumferential direction and the attaching member 72 is rotatable. A length of the elongated hole 76 is designed to be long enough to allow the bolt 74 to move from an initial position where the vehicle weight is not applied to the coil spring 56 until a position where the vehicle weight is applied to the coil spring 56 and there occurs no or a small amount of rotational torque of the coil spring 56.

Specifically, firstly the damper fork 64 of the damping device 55 is connected to the front lower arm 32, and the bolts 74 of the attaching member 72 are inserted into the elongated hole 76 of the suspension tower portion 6 to provide a temporary attachment, wherein the attaching member 72 is still rotatable. Namely, when the attaching member 72 rotates, the upper sheet 80 fixed to the attaching member 72 also rotates freely relatively with respect to the lower sheet 82, thereby releasing any rotational torque which may occur at the coil spring 56.

Next, the vehicle weight is applied to the coil spring 56 by placing the vehicle on the ground. Herein, although the coil spring 56 is contracted and generates the rotational torque, the bolts 74 move freely along the elongated hole 76 at the same time. As a result, the coil spring 56 is kept in a state where there exists no rotational torque at the coil spring.

Subsequently, under 1 G vehicle height condition where the vehicle is placed on the ground, the attaching member 72 and the suspension tower portion 6 are fastened together finally. The front suspension device 1 of the present embodiment is attached to the vehicle body in this way.

In the second embodiment described above, the bolts 74 of the attaching member 72 are configured so as to move freely along the elongated hole 76 of the suspension tower portion 6 and a final fastening of the damping device is done under the 1 G vehicle height condition. Accordingly, there occurs no rotational torque at the coil spring 56 under the 1 G vehicle height condition. Thus, when the vehicle is driven straight and at a constant speed, the coil spring is contracted to a certain degree which is equivalent to that under the 1 G vehicle height condition. As a result, there occurs no displacement of the lower arms 32, 34 and the deterioration of the straight driving stability of vehicle caused by changes of the toe angle and the caster trail of the wheel can be avoided properly.

Further, when the vehicle is driven straight and under acceleration of deceleration condition, the coil spring 56 is extended or contracted from its normal position state where the vehicle is driven straight and at the constant speed. Herein, a magnitude of the rotational torque occurring at the coil spring 56 is not so large because there does not occur so big weight change at the vehicle under this condition as that under the vehicle rolling condition. As a result, there may occur so small displacement of the lower arms 32, 34, even if there may occur, and the deterioration of the straight driving stability of vehicle caused by changes of the toe angle and the caster trail of the wheel can be avoided properly.

Herein, as an alternative of the second embodiment, the lower sheet 82 of the coil spring 56 may be attached to the cylinder 62 of the damper 58 so as to rotate, and the damping device 55 is assembled to the vehicle body as described above.

Embodiment 3

Next, a front suspension device for an automotive vehicle according to the third embodiment of the present invention will be described. The basic structure of the suspension device of the third embodiment is the same as that of the first embodiment shown in FIGS. 1 to 5 and the second embodiment shown in FIG. 7, and a different structure will be described.

In the front suspension devise for an automotive vehicle according to the third embodiment, the damping device 55 is attached to the vehicle body in a state where a specified twisted-pretension is applied to the coil spring 56 prior to the attachment of the damping device, and there occurs no or a small amount of rotational torque according to extension and contraction of the coil spring 56 under at least the straight vehicle driving condition.

Specifically, firstly, the damper fork 64 of the damping device 55 is connected with the front lower arm 32, and the attaching member 72 (piston rod 60) is attached at a specified position of the suspension tower portion 6, twisting it so as to rotate relatively with respect to the cylinder 62 of the damper 58 (damper fork 64 and front lower arm 32) by using a guide member which controls a position of the attaching member 72 with respect to the vehicle body and guides it. As a result, since the upper sheet 80 fixed to the attaching member 72 (piston rod 60) rotates with respect to the lower sheet 82 fixed to the cylinder 62, the coil spring 56 is attached in a state where it is twisted about the coil axis. The present embodiment is configured such that the attaching member 72 is rotated counterclockwise and there occurs a counterclockwise rotational torque at the lower end of the coil spring 56 with a counterclockwise winding direction, prior to the attachment of the damping device. In this case, the fastening position of the hole 76 of the suspension tower portion 6 is shifted from that in the first embodiment (see FIG. 3) by a certain amount according to a twisted amount of the coil spring 56.

After the damping device 55 is attached to the vehicle body in this way, the vehicle is placed on the ground, and then the rotational torque occurs at the coil spring 56 because of its compression, i.e., the clockwise rotational torque occurs at the lower end of the coil spring 56. Namely, the rotational toque applied by twisting the coil spring 56 in advance and the rotational torque which may occur because of the spring's compression are offset by each other, thereby providing no rotational torque at the coil spring 56 eventually.

In this way, the present embodiment is configured such that there occurs no rotational torque at the coil spring 56 under the 1 G vehicle height condition where the vehicle is placed on the ground, by arranging that the rotational toque applied by twisting the coil spring 56 in advance is equivalent to the rotational torque which may occur because of the spring's compression, in other words, that a pre-twisted amount of the coil spring 56 is equivalent to a rotational amount of the coil spring which may occur because of the spring's compression.

In the third embodiment described above, the coil spring 56 is attached to the vehicle body in a state where a specified twisted-pretension is applied to the coil spring 56 prior to its attachment and thus there occurs no rotational torque eventually at the coil spring 56 under the 1 G vehicle height condition. Accordingly, when the vehicle is driven straight and at a constant speed, the coil spring is contracted to a certain degree which is equivalent to that under the 1 G vehicle height condition. As a result, there occurs no displacement of the lower arms 32, 34 eventually, and the deterioration of the straight driving stability of vehicle caused by changes of the toe angle and the caster trail of the wheel can be avoided properly.

Further, when the vehicle is driven straight and under acceleration of deceleration condition, the coil spring 56 is extended or contracted from its normal position state where the vehicle is driven straight and at the constant speed. Herein, a magnitude of the rotational torque occurring at the coil spring 56 is not so large because there does not occur so big weight change at the vehicle under this condition as that under the vehicle rolling condition. As a result, there may occur so small displacement of the lower arms 32, 34, even if there may occur, and the deterioration of the straight driving stability of vehicle caused by changes of the toe angle and the caster trail of the wheel can be avoided properly.

Embodiment 4

Next, a front suspension device for an automotive vehicle according to the fourth embodiment of the present invention will be described. The basic structure of the suspension device of the fourth embodiment is the same as that of the first embodiment shown in FIGS. 1 to 5 and the second embodiment shown in FIG. 7, and a different structure will be described.

Figure 9:
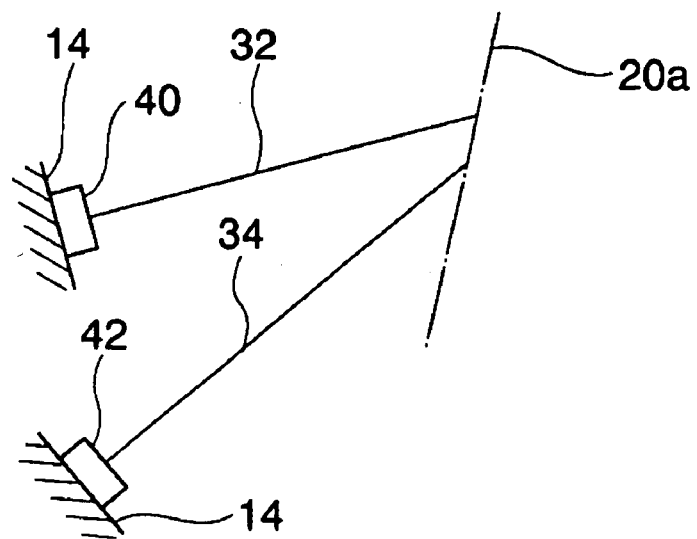
FIG. 9(a), (b) are plan views for schematically showing positional relationships between a lower arm and a right front wheel of a front suspension device for an automotive vehicle respectively according to the fourth embodiment of the present invention.
Figure 9:
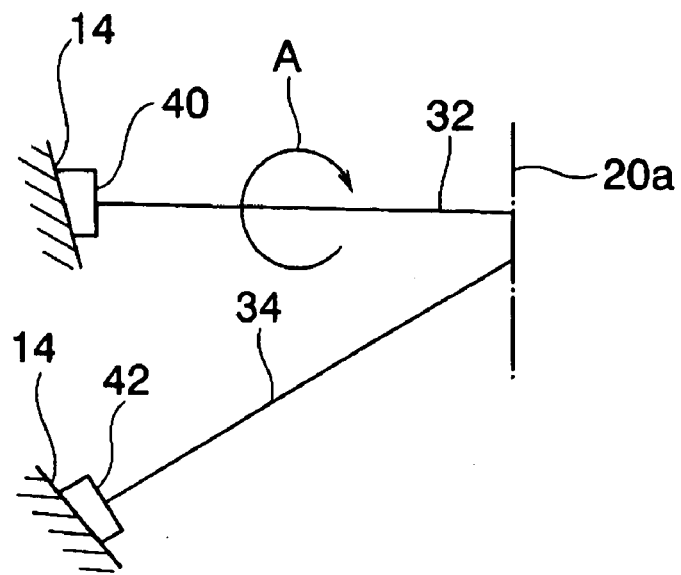
Figure 10:
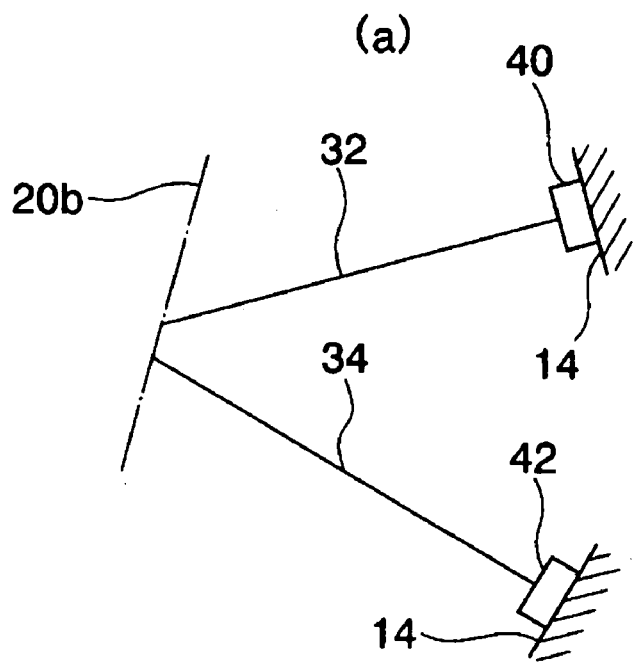
FIG. 10(a), (b) are plan views for schematically showing positional relationships between a lower arm and a left front wheel of the front suspension device for an automotive vehicle respectively according to the fourth embodiment of the present invention.
Figure 10:
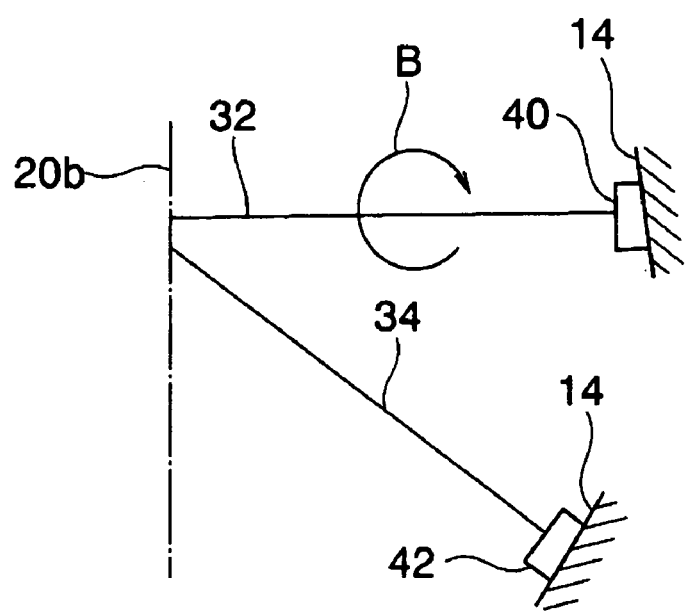

FIG. 9 is a plan view for schematically showing a positional relationship between a lower arm and a front wheel for a right front wheel. FIG. 9(a) shows the "full rebound condition" where the right front wheel of the front suspension device does not contact on the ground, FIG. 9(b) shows the 1 G vehicle height condition where the right front wheel of the front suspension device contacts on the ground. FIG. 10 is plan view of a left front wheel, shown like FIG. 9.

In the front suspension devise for an automotive vehicle according to the fourth embodiment, the lower arms 32, 34 are arranged so as to be attached to the vehicle body in a specified state where the arrangement functions so as to suppress or offset a displacement of the front lower arm 32 caused by the rotational torque applied according to extension and contraction of said coil spring 56.

In the present embodiment, as shown in FIGS. 9(a) and 10(a), attaching angles of the lower arms 32, 34 with respect to the vehicle body in the longitudinal direction of the vehicle when the vehicle of the front suspension device does not contact on the ground are arranged such that a front end of a right front wheel 20a is offset outward and a front end of a left front wheel 20b is offset inward from standard toe angles thereof. Herein, the bushes 40, 42 are not deformed.

Next, when the vehicle is under 1 G vehicle height condition, the coil spring 56 is contracted and the clockwise rotational torque occurs at the lower end of the coil spring 56 with counterclockwise winding direction of the present embodiment, and rotational torques A, B shown in FIGS. 9(b) and 10(b) are conveyed to the front lower arm 32. In the present embodiment, the rotational torques A, B deform respective bushes 40, 42, and the lower arms 32, 34 change in displacement so as to be located at their regular positions. Namely, the attaching angles of the lower arms 32, 34 with respect to the vehicle body in the longitudinal direction of the vehicle are arranged in a specified state, i.e., being offset toward reverse directions, where the arrangement functions so as to suppress or offset the displacements of the front lower arms 32, 34 caused by the rotational torque applied according to extension and contraction of said coil spring 56.

Herein, when the vehicle is under the 1 G vehicle height condition where the lower arms 32, 34 are located at their regular positions, the rotational torques A, B of the coil spring 56 are substantially balanced with reaction forces of respective bushes 40, 42, 66.

In the fourth embodiment described above, the lower arms 32, 34 are arranged so as to be attached to the vehicle body in the specified state i.e., being offset toward reverse directions, where the arrangement functions so as to suppress or offset the displacement of the lower arms 32, 34 caused by the rotational torque applied according to extension and contraction of said coil spring 56. Accordingly, when the vehicle is driven straight and at a constant speed, the coil spring is contracted to a certain degree which is equivalent to that under the 1 G vehicle height condition. As a result, there occurs no displacement of the lower arms 32, 34 eventually, and the deterioration of the straight driving stability of vehicle caused by changes of the toe angle and the caster trail of the wheel can be avoided properly.

Further, when the vehicle is driven straight and under acceleration of deceleration condition, the coil spring 56 is extended or contracted from its normal position state where the vehicle is driven straight and at the constant speed. Herein, a magnitude of the rotational torque occurring at the coil spring 56 is not so large because there does not occur so big weight change at the vehicle under this condition as that under the vehicle rolling condition. As a result, there may occur so small displacement of the lower arms 32, 34, even if there may occur, and the deterioration of the straight driving stability of vehicle caused by changes of the toe angle and the caster trail of the wheel can be avoided properly.

Embodiment 5

Next, a front suspension device for an automotive vehicle according to the fifth embodiment of the present invention will be described referring to FIG. 11. The basic structure of the suspension device of the fifth embodiment is the same as that of the first embodiment shown in FIGS. 1 to 5 and the second embodiment shown in FIG. 7, and a different structure will be described.

Figure 11:
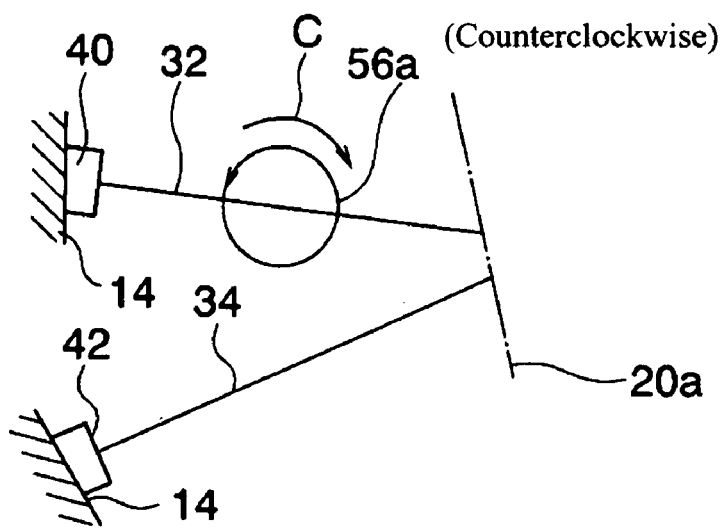
FIG. 11(a), (b) are plan views for schematically showing positional relationships between a lower arm and a front wheel of a front suspension device for an automotive vehicle respectively according to the fifth embodiment of the present invention, under the 1 G vehicle height condition where the front wheel contacts on the ground.
Figure 11:
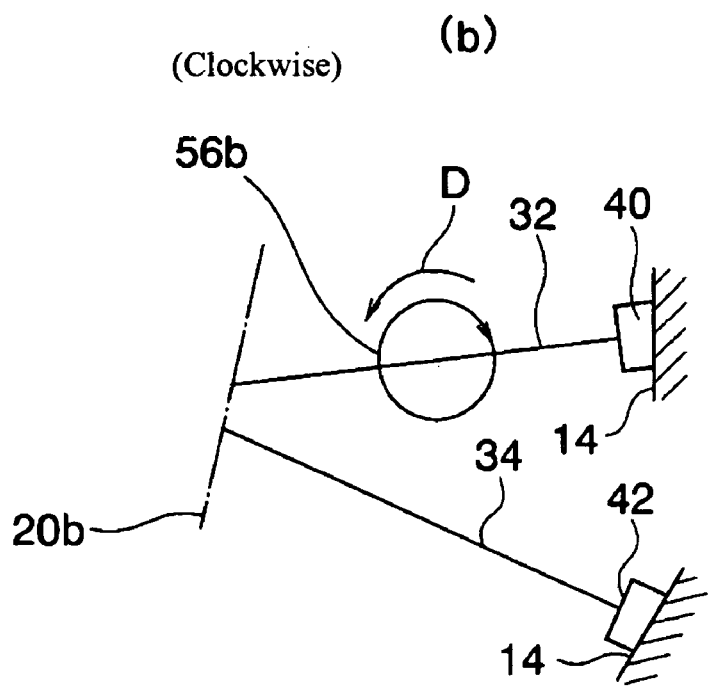
Figure 12:
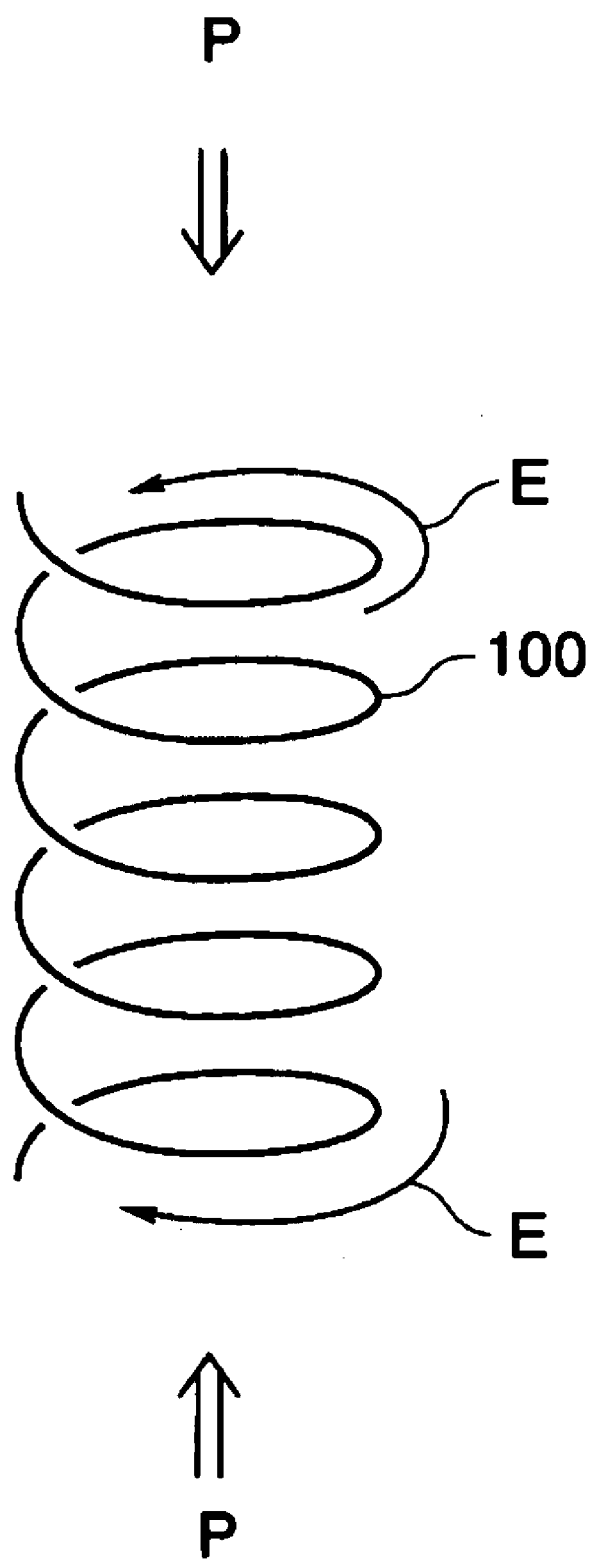
FIG. 12 is a conceptual diagram for explaining a force acting on the coil spring and a force occurring at the same.
Figure 13:
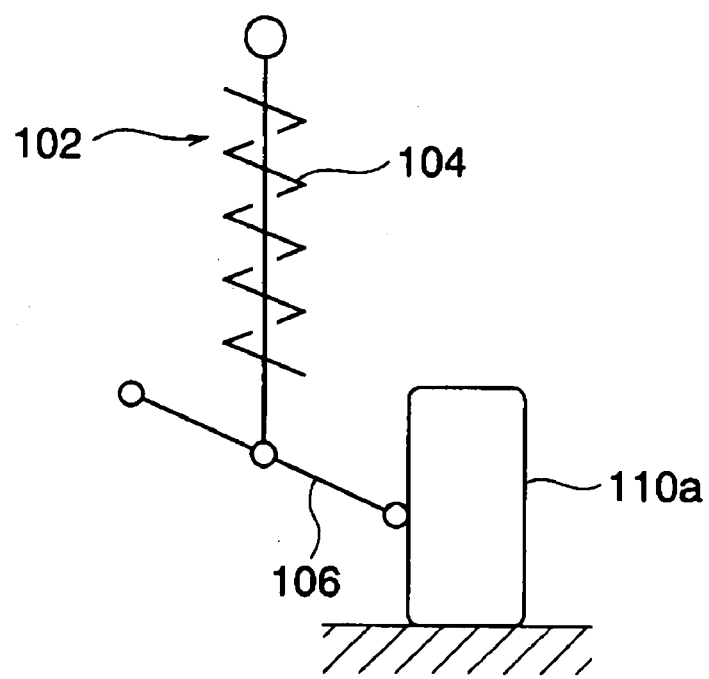
FIG. 13(a), (b) are diagrams for schematically showing positional relationships between the lower arm and the front wheel under the "full rebound condition" where the right front wheel does not contact on the grand; an elevation view FIG. 13(a) and a plan view FIG. 13(b).
Figure 13:
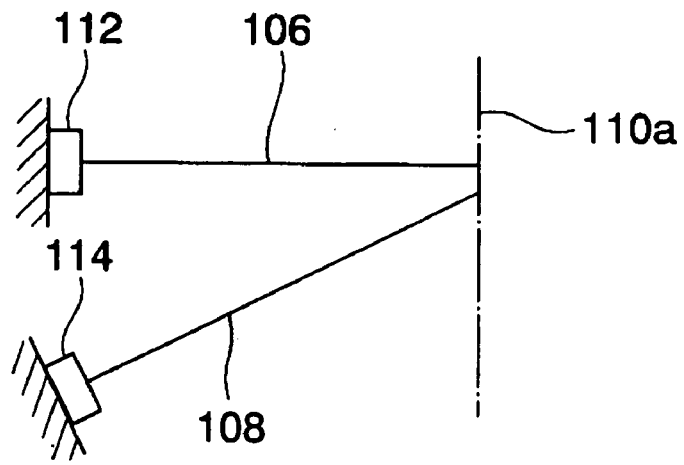

FIG. 11 is a plan view for schematically showing a positional relationship between a lower arm and a front wheel under the 1 G vehicle height condition where the front wheel contacts on the ground, and that of the right front wheel side is shown in FIG. 11(a) and that of the left front wheel side is shown in FIG. 11(b).

In the front suspension device for an automotive vehicle of the fifth embodiment, as shown in FIG. 11, the front suspension for the right front wheel is equipped with a coil spring 56a having a counterclockwise winding, while the front suspension for the left front wheel is equipped with a coil spring 56b having a clockwise winding. Accordingly, displacement of the right and left wheels 20a, 20b in the toe angle caused by the rotational torque of the coil springs 56a, 56b becomes symmetrical.

Specifically, in the front suspension device 1 according to the present embodiment as shown in FIG. 11, a clockwise rotational torque C acts on the front lower arm 32 of the right front wheel equipped with the coil spring 56a with a counterclockwise winding, while a counterclockwise rotational torque D acts on the front lower arm 32 of the left front wheel equipped with the coil spring 56b with a clockwise winding, under the 1 G vehicle height condition. Namely, in the present embodiment, respective winding directions of the coil springs 56a, 56b are selected such that the both front wheels change in displacement in a toe-in direction with their front ends moving inward.

According to the fifth embodiment configured above, since the coil springs 56a, 56b for the right and left front wheels have different winding directions from each other, the both wheels change in toe angles symmetrically and their caster trails also change symmetrically, i.e., with no difference between the left and right wheels. As a result, the straight driving stability of vehicle can be obtained. Further, since respective winding directions of the coil springs 56a, 56b are selected such that the both front wheels change in displacement in the toe-in direction with their front ends moving inward, the straight driving stability of vehicle can be further improved, compared with a case in which the both front wheels change in displacement in a toe-out direction with their front ends moving outward.

Herein, when the vehicle is driven under vehicle rolling condition, the coil spring 56 of a steered outside wheel is further contracted by a changed weight because of rolling of the vehicle body, and a larger rotational torque than that during the straight driving condition is applied to the front lower arm 32. According to the present embodiment, the winding direction of the coil spring 56 is configured such that the compression of the coil spring 56 always makes the steered outside wheel change in the displacement in the toe-in direction, thereby improving a vehicle stability under the steering condition as well.

Herein, the fronts suspension device 1 of the fifth embodiment has a characteristic that when the clockwise rotational torque C acts on the front lower arm 32 of the right front wheel and the counterclockwise rotational torque D acts on the front lower arm 32 of the left front wheel, the both front wheels change in displacement in the toe-in direction with their front ends moving inward. However, there may be a case in which the both front wheels change in displacement in the toe-out direction instead when such rotational torques act, depending upon any structure of the front suspension device, such as an attaching angle of the tie rod to the wheel support member, and an arrangement of two pivots of the lower arm and so on. In that case, it is preferred that the front suspension for the right front wheel is equipped with a coil spring having a clockwise winding and the front suspension for the left front wheel is equipped with a coil spring having a counterclockwise winding such that the clockwise rotational torque acts on the front lower arm of the left front wheel and the counterclockwise rotational torque acts on the front lower arm of the right front wheel.

Any other additional modifications may be applied within the scope of the present invention.

As described above, according to the front suspension device of the present invention, the deterioration of the straight driving stability of vehicle brought about by changes of the toe angle and the caster trail of the wheel which are caused by the rotational torque occurring according to extension and contraction of the coil spring of the damping device can be prevented, and the maneuverability and stability of the vehicle can be improved.

What is claimed is:

1. A front suspension device for an automotive vehicle, in which wheel support members of right and left front wheels are coupled with each other via a steering unit, an outer end of each of two lower arms is pivotally attached to the wheel support members respectively, and an inner end of each of two lower arms is pivotally attached to a vehicle body via a resilient member respectively, the front suspension device comprising:

- a damping device equipped with a coil spring and attached to at least one of said two lower arms at a lower end thereof and to the vehicle body at an upper end thereof, respectively; and
- a suppression device for suppressing a toe-change of said front wheels caused by a rotational torque which is applied to said at least one of the two lower arms, to which said damping device is attached, according to extension and contraction of said coil spring of the damping device,
- wherein said suppression device includes a vehicle body member which constitutes part of the vehicle body to which said damping device is attached at the upper end thereof and is equipped with an elongated hole formed so as to extend in a circumferential direction of the damping device, and an attaching member for attaching said damping device to the vehicle body with an attaching bolt which is adaptive to get through said elongated hole of the vehicle body member, and said damping device is attached to the vehicle body by said attaching member such that said attaching bolt is fastened in a state where there is provided no or a small amount of rotational torque applied to said at least one of the two lower arms, by applying a load corresponding to a vehicle weight to said coil spring so as to allow the attaching bolt unfastened to move in and along said elongated hole.

2. The front suspension device for an automotive vehicle of claim 1, wherein said damping device is disposed in a substantially vertical direction of the vehicle.

3. The front suspension device for an automotive vehicle of claim 1, wherein said two lower arms include a front lower arm comprised of a lateral link extending outward from the vehicle body in a substantially width direction of the vehicle and a rear lower arm comprised of a compression link extending forward and outward from the vehicle body in a substantially oblique direction of the vehicle, and a position of a pivotal attachment of said front lower arm to the wheel support member is located forward and inside of that of a pivotal attachment of said rear lower arm to the wheel support member.

4. A method for manufacturing a front suspension device for an automotive vehicle, in which wheel support members of right and left front wheels are coupled with each other via a steering unit, an outer end of each of two lower arms is pivotally attached to the wheel support members respectively, an inner end of each of two lower arms is pivotally attached to a vehicle body via a resilient member respectively, the method comprising:

- a step of providing a damping device equipped with a coil spring;
- a step of attaching a lower end of said damping device to at least one of said two lower arms; and
- a step of attaching an upper end of said damping device to a vehicle body in a state where said coil spring has been contracted to a specified extent and a rotational torque caused by the contracted coil spring has been released, such that there occurs no or a small amount of the rotational torque applied to said at least one of the two lower arms according to extension and contraction of said coil spring under at least a straight vehicle driving condition.

* * * * *